July 19, 1927.
H. F. DUMBLETON
1,636,595
APPARATUS FOR AND PROCESS OF MAKING TIRES
Filed Oct. 20, 1920    2 Sheets-Sheet 2
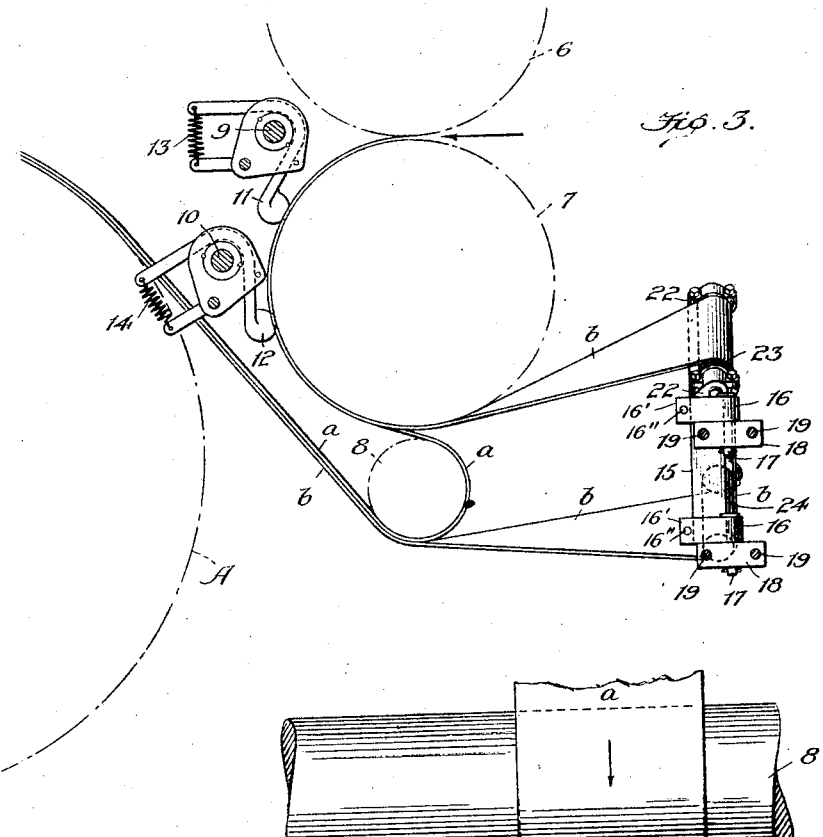
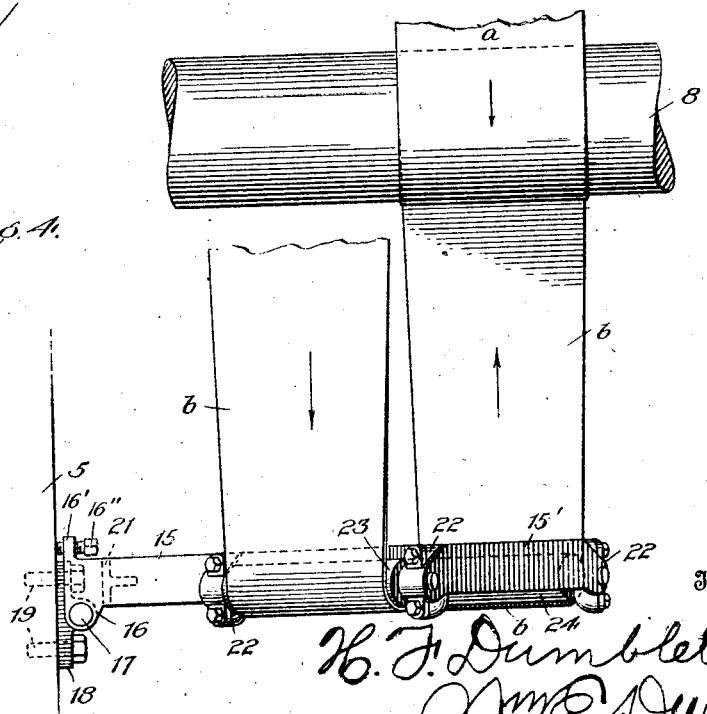

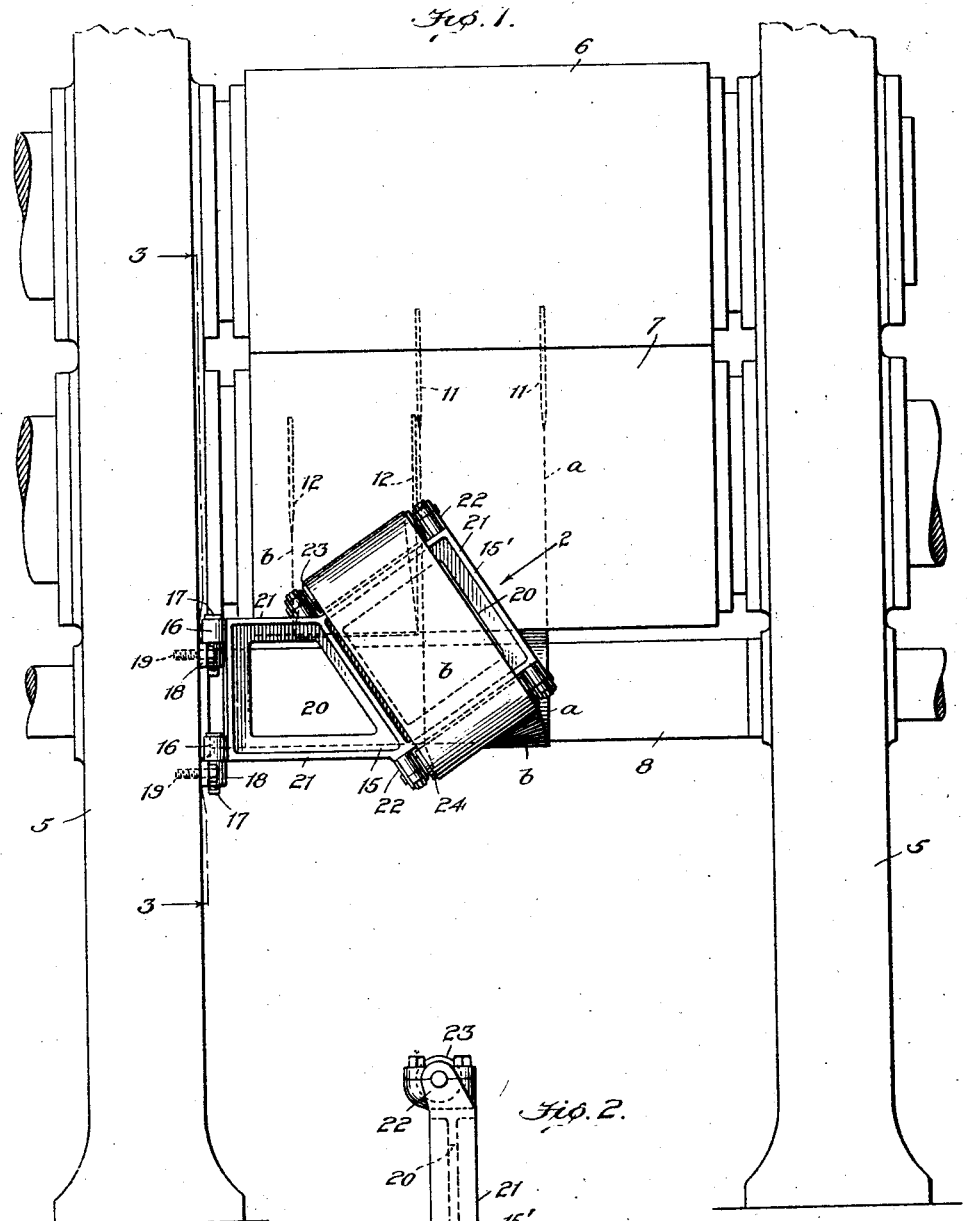
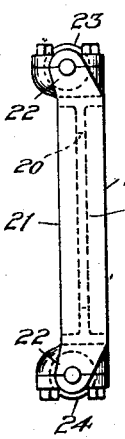

Patented July 19, 1927.

1,636,595

UNITED STATES PATENT OFFICE.

HAROLD F. DUMBLETON, OF CLEVELAND, OHIO, ASSIGNOR TO THE REPUBLIC RUBBER CORPORATION, OF YOUNGSTOWN, OHIO, A CORPORATION OF OHIO.

APPARATUS FOR AND PROCESS OF MAKING TIRES.

Application filed October 20, 1920. Serial No. 418,275.

This invention relates to the manufacture of resilient tires for vehicle wheels. More particularly stated it relates to new and improved apparatus, and also process steps, for forming solid rubber tires, or similar articles of manufacture, wherein compactness, elasticity, and durability are required.

Heretofore, in the manufacture of solid tires, it has been customary to wind upon a metal tire base or tire band, either by hand or directly from a calender roll, suitably compounded calendered strips of rubber stock in semi-plastic, heated and consequently adhesive condition. Such strips heretofore have been applied or wound upon the tire band singly, that is to say one after another successively, until a sufficient amount of stock has thus been applied, whereupon the structure was completed by the ordinary well understood process of vulcanization.

One object of the present invention is to provide means whereby a plurality of strips, or ribbons of calendered stock may be simultaneously applied to a tire band directly from a calender roll, thereby materially reducing the time required to build up a tire to the point of vulcanization.

A further object of this invention is the production of apparatus which makes possible a more uniform as well as a more expeditious, winding of rubber stock upon a tire band, with a consequent reduction in labor costs, and material advantages in the matter of accuracy and precision of construction.

With the foregoing and other objects and advantages in view the present invention will now be particularly described and then pointed out in the appended claims.

In the accompanying drawings which form part of this application for Letters Patent, and whereon corresponding numerals refer to the same parts in the several illustrations:

Figure 1 is a diagrammatic representation in rear elevation of a pair of calendering rolls, and a similar view in full lines of the attachment which constitutes the present invention, and makes possible the present method of operation;

Figure 2 is a disconnected relatively enlarged edge view of the present attachment looking in the direction indicated by arrow 2 of Figure 1;

Figure 3 is also a diagrammatic view taken on the line 3—3 of Figure 1, with the side supporting frame of the calender rolls removed; and Figure 4 is a fragmentary plan view still further enlarged, of the present attachment in operation, the calender rolls here being omitted for the sake of clearness.

Reference being had to the drawings and numerals thereon, 5 indicates the calender frame or roll supporting members; 6 and 7 indicate upper and lower calendering rolls respectively, and 8 an underlying stock delivery roll, all suitably journalled in said frame 5, and all of the ordinary well known forms of construction. The usual means for heating and driving said calender rolls (not shown) are also presumed to be present.

Journalled upon suitable rods 9 and 10 mounted in both sides of frame 5, adjacent to and parallel with the lower calender roll 7, is a duplicate series of upper and lower cutters or knives 11, 11, and 12, 12, arranged and adapted to contact, when in actual service, with the front of calender roll 7 as shown, each under influence of its respective spring 13 and 14, with its particular knife in yielding engagement for cutting purposes. These knives also may be of known form, but are laterally adjustable in pairs upon their respective supporting shafts or rods 9 and 10, for the purpose of cutting calendered rubber stock into parallel adjacent strips of predetermined width from a single sheet of suitably compounded rubber formed upon the face of roll 7, as indicated by the letters $a$ and $b$ in Figures 1, 3 and 4 of the drawings.

In front of the calender and at suitable distance therefrom as indicated by the dot and dash line A, an ordinary metal tire band is journalled to rotate away from said calender, as usual when a single ply of calendered rubber stock was delivered directly from calender to said band in the ordinary process of forming tires.

At the opposite side or in rear of the rolls 6, 7 and 8, there is hinged to or journalled upon, one of the side supports 5, a swinging bracket 15, preferably of cast iron, having upper and lower projecting lugs 16 perforated to receive hinge pintles 17, which latter enter similarly perforated couplings 18, bolted to frame 5 as at 19, to complete the said hinge connection. This bracket member 15 at top and bottom, also has forwardly projecting shoes 16', each bearing screw stops 16" adjustably contacting with calender frame 5 to regulate and limit the inward movement of said bracket 15.

This swinging frame or bracket 15 includes an integral angular projecting portion 15', is preferably of skeleton form with openings 20 for the purpose of reducing weight, and is reinforced by surface ribs 21 extending completely around both sections 15 and 15' upon both sides thereof.

The angularly arranged bracket or frame portion 15' at its top and bottom is offset somewhat as at 22 and in these offsets as shown are journalled upper and lower guide rollers 23 and 24, for purposes which will now appear in a brief statement of use, and the several process steps employed in carrying out the present invention.

Suitably compounded rubber stock is fed as usual to the calendar rolls 6 and 7 as indicated by the arrow in Figure 3. When properly calendered the sheet thus formed upon roll 7 is stripped or cut into ribbons of predetermined width and in adjacent vertical planes, by the action of knives 11, 11 and 12, 12 arranged in pairs and adjustably mounted on shafts 9 and 10, respectively.

Strip $a$ thus cut is conducted from the face of roll 7 directly around and beneath the delivery roll 8, and thence to the upper periphery of tire band A, rotatively mounted in the same vertical plane, to which band the strip readily adheres.

Bracket 15 is thereupon swung upon its hinge connections, or pintles 17, until arrested by engagement of its screw stops 16" with the inner surface of calender frame 5, by means of which adjustable screw stops it is then caused to assume a position parallel with the longitudinal axis of roll 7, and delivery roll 8, as best shown by Figure 4.

The adjacent strip $b$ of calendered stock is then conducted beneath roll 7, over angularly disposed guide rollers 23 and 24 of frame 15', thence beneath and consequently into the same vertical plane with the strip $a$ aforesaid to which it adheres while passing under roll 8, for simultaneous application to, or winding upon, the tire band A with great accuracy, speed and precision.

The aforesaid process of cutting calendered rubber stock into strips of predetermined width in adjacent vertical planes from a single sheet of material, directing such strips into a single path of travel, and simultaneously winding them in superimposed relation upon a tire band, greatly facilitates production and is continued until a sufficient tire body has been built up, whereupon the structure is completed by vulcanization.

And, it is entirely within the spirit and intent of this invention to similarly equip the opposite side frame 5 with another swinging bracket 15 having guide rollers 23 and 24 arranged at the reverse angle, for the purpose of directing a third ply or even a greater number of calendered strips beneath strips $a$ and $b$ aforesaid at one and the same time.

The foregoing being a description of the present invention in one practical form of embodiment, it should be understood that same is by no means limited to the apparatus or to the particular construction and arrangement of parts shown and described, but may be varied greatly, and to all such variations I lay claim so long as they are capable of accomplishing substantially the same results by substantially the same means.

Having thus described this invention what I now claim and desire to secure by Letters Patent is:—

1. In a machine for forming solid resilient tires, the combination with calendering rolls and means for rotatably supporting a tire band arranged adjacent thereto and having its axis substantially parallel to the axes of said rolls, of means for cutting calendered stock from one of said rolls in parallel adjacent strips, a bracket mounted upon the calender frame to swing horizontally, and a pair of guide rollers carried by the bracket and having their axes arranged at angles to the horizontal, said guide rollers being positioned to receive one of said strips and to conduct it beneath the other of said strips for simultaneously winding both strips in superposed relation upon a tire band.

2. In a machine for forming solid resilient tires the combination with calendering rolls and means for rotatably supporting a tire band arranged adjacent thereto, of means for cutting calendered stock from one of said rolls in parallel adjacent strips, a bracket upon the calender frame mounted to swing into parallelism with the rolls, and guide rollers carried by said bracket at an angle to the longitudinal axes of the rolls adapted to receive one of said strips and to conduct it beneath another of said strips for simultaneously winding both of said strips in superposed relation upon a tire band.

3. An attachment for calendering rolls comprising a swinging bracket pivotally secured to one side frame of the structure and movable toward and away from said rolls, an adjustable stop for limiting the movement of said bracket toward said rolls, and guide-rollers mounted in the upper and lower edges of said bracket and having their axes in a plane parallel to the plane of the axes of said rolls and adapted to receive a strip of calendered rubber stock and to direct the same laterally into an adjacent vertical plane for utilization.

4. The process of forming solid resilient tires which consists in cutting a plurality of strips from a sheet of calendered rubber stock, directing said strips into a single path of travel, simultaneously winding said strips in superimposed relation and close contact upon a suitable tire band, and then forming same into a homogeneous mass by vulcanization.

5. The process of forming solid resilient tires which consists in cutting a strip of rubber stock from the face of a calender roll, cutting similar strips from the face of the same roll in adjacent vertical planes, directing all of said strips into one of said vertical planes, simultaneously winding said strips in superimposed relation and in close contact upon a suitable tire band, and then vulcanizing the tire thus formed.

6. The combination with calender rolls and their supporting structure, of a bracket pivotally mounted on said structure and having an upwardly directed angularly arranged extension, parallel angularly arranged guide rolls carried by said extension and located one above the other, said guide rolls being arranged at one side of said calender rolls and being adapted to twist a strip of material from the calender rolls into superposed relation with another strip issuing from said rolls, a second roll adapted to receive the strips from the calender rolls and guide rolls, and means for rotatably supporting a tire band arranged on the opposite side of the calender rolls from the guide rolls and adapted to receive said superposed strips.

7. In a machine for forming resilient tires, in combination, a frame, rotatable calendering rolls mounted upon the frame, means for rotatably supporting a tire band arranged at one side of said rolls and having its axis substantially parallel to the axes of the rolls, means for cutting calendered stock from said rolls into adjacent strips, and guiding means arranged at the other side of said rolls for transferring one of said strips from a predetermined plane into an adjacent parallel plane and into superposed relation with another one of said strips, whereby a plurality of strips in superposed relation may be simultaneously wound upon a tire band.

8. In a machine for forming resilient tires, the combination with calendering rolls and means for rotatably supporting a tire band arranged at one side thereof and having its axis substantially parallel to the axes of said rolls, of means for dividing calendered stock upon one of said rolls into adjacent strips, said band being arranged out of alinement with the dividing means to permit one of said strips to be directly led onto the band, and means at the opposite side of said rolls for guiding the other one of said strips from a position at one side of the dividing means to the other side of the dividing means, so that the last mentioned strip may be contacted with the first mentioned strip and both be wound simultaneously on a band.

9. In a machine for forming resilient tires, the combination with calendering rolls, of means for cutting calendered stock from one of said rolls in parallel adjacent strips, a bracket mounted upon the calender frame to swing horizontally, and a pair of guide rollers carried by the bracket having their axes arranged at an angle to the horizontal, said guide rollers being positioned to receive one of said strips and to conduct it beneath the other of said strips to form a laminated structure.

10. In a machine for forming resilient tires, the combination with calendering rolls, of means for cutting calendered stock from one of said rolls in parallel adjacent strips, a bracket mounted upon the calender frame to swing horizontally, and a pair of guide rollers carried by said bracket having their axes arranged at an angle to the horizontal, said guide rollers being positioned to receive one of said strips and to conduct it beneath the other of said strips for simultaneously winding both strips in superposed relation upon a suitable tire band.

In testimony whereof I affix my signature.

HAROLD F. DUMBLETON.